UNITED STATES PATENT OFFICE.

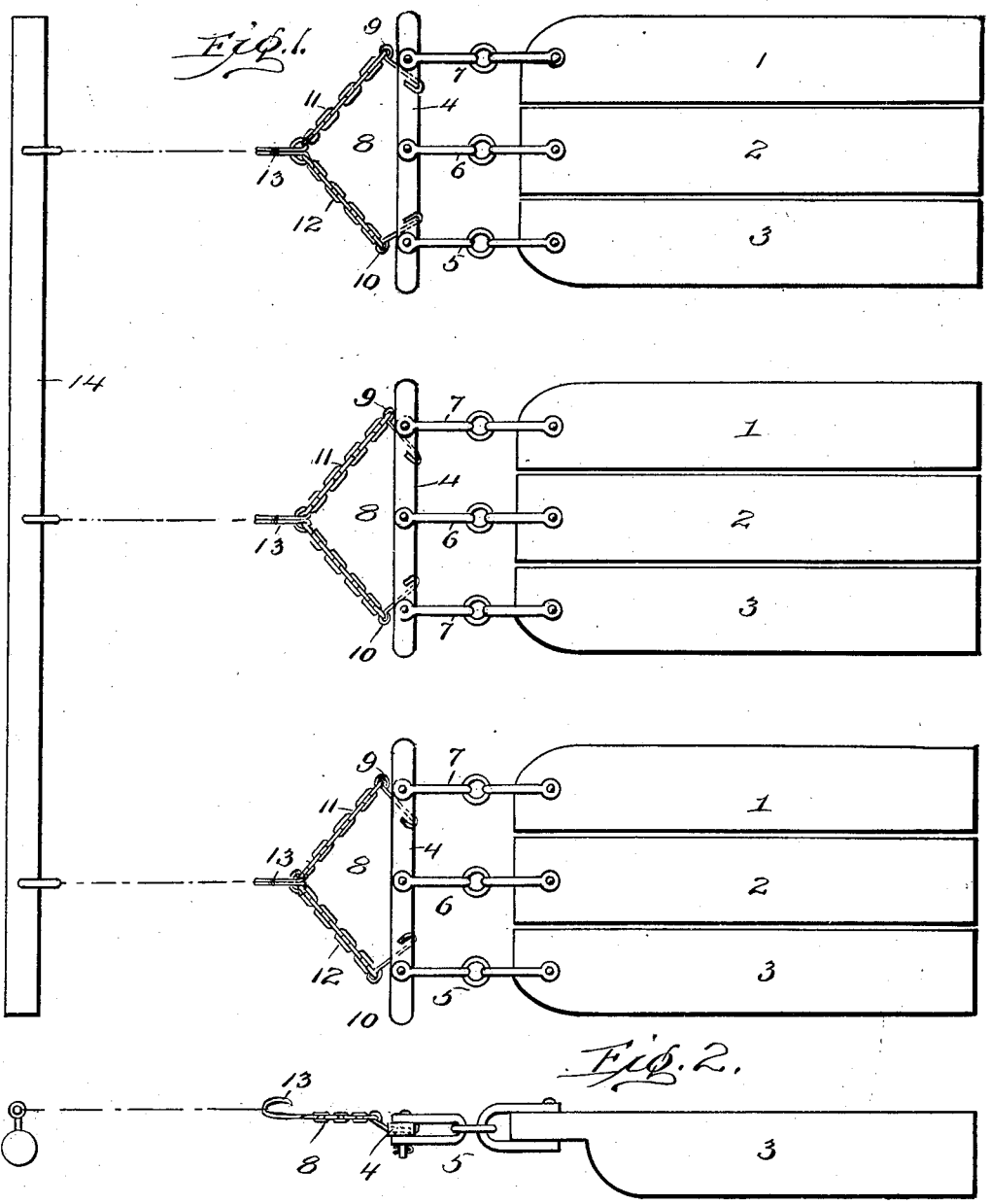

WILLIAM L. ROSSON, OF MILFORD, TEXAS.

DEVICE FOR KILLING BOLL-WEEVILS.

No. 897,850.  Specification of Letters Patent.  Patented Sept. 1, 1908.

Application filed December 16, 1907. Serial No. 406,707.

*To all whom it may concern:*

Be it known that I, WILLIAM L. ROSSON, a citizen of the United States, residing at Milford, in the county of Ellis and State of Texas, have invented certain new and useful Improvements in Devices for Killing Boll-Weevils, of which the following is a specification.

This invention relates to improvements in means for destroying weevils, vermin, and the like that thrive in cotton fields, etc., and comprises means that may be propelled across a field of any contour and yet easily adjust itself to the same.

The invention further comprises the provision of a plurality of drag bars or members that are pivotally secured to a cross member so that as the cross member is moved from place to place each drag bar will be allowed or permitted a free up and down or vertical movement independent of the remaining bars.

The object in view is the provision of a boll weevil exterminator formed with a plurality of bars that are designed to be pivotally secured in position so that as the same are moved across the field each bar will independently adjust itself to the particular shape of the earth over which the same is passing.

With these and other objects in view the invention comprises certain novel constructions, combinations, and arrangement of parts as will be hereinafter more fully described and claimed.

In the accompanying drawing: Figure 1 is a top plan view of the preferred form of my invention. Fig. 2 is a side elevation of Fig. 1.

In raising cereals, grain, cotton, or the like it has been found that various insects or vermin attack the crop to a greater or less extent and various means have been provided for entirely exterminating the vermin, or to as nearly exterminate the same as possible. In the raising of cotton the weevil is particularly objectionable and it is very important that substantially all of the same should be exterminated in order to properly raise the cotton.

The present invention relates to means for exterminating the weevil, either after it has attained some size or while still in the boll or in the eggs.

Referring more particularly to the drawing, 1, 2 and 3 represent drag bars that are secured to a cross bar or beam 4 by pivotal or hinge members or clevis and rings 5, 6, and 7. By this means each of the drag bars 1, 2 and 3 may move up and down on a pivot point or in a vertical plane so that as the drag bars are moved across the field each bar may move up and down according to the contour of the earth. A suitable attaching means 8 is pivotally secured to bar 4 so that the device may be propelled or pulled through the field as may be desired. Attaching means 8 is preferably constructed of hook shaped members 9 and 10, and chains 11 and 12. Chains 11 and 12 are held in position by a hooked shaped member 13 that is designed to have a whiffle-tree secured thereto. The chains 11 and 12 are of equal length so that any draft upon the whiffle-tree secured to hook or member 13 will evenly pull or drag the bars 1, 2 and 3 across the field. Ordinarily three drags composed of members 1, 2 and 3 and connecting mechanism are pulled across the field at one time, a single horse being usually attached to each of the drags.

In order that the draft animals may keep their distance properly for dragging the drag bars between the rows of cotton, a tracing bar or member 14 is arranged to be secured to the bit ring of the bridle of each animal, so that the animals will always be properly positioned in relation to each other for dragging the exterminator between adjacent rows of cotton.

Preferably the drags or exterminators are used in sets of three so as to permit one person to operate the same and thus limit the cost of operation, but it will be evident that if desired a single drag may be used, the same passing between the rows of cotton.

When dragging or pulling the device across the field it is to be understood that the same passes between the rows of cotton and crushes or bruises sufficiently the boll weevils or other vermin that may be passed over. The present invention will also smooth the ground so the weevil in endeavoring to reach the cotton will roll off into the space between the rows, or when dropping from the cotton will fall between the rows, and the next time that the device is pulled across the field it will crush all the boll weevils that may have fallen between the rows.

It is designed to pull or drag a structure formed according to the present invention across the field at short intervals during the time when the weevil is prevalent so as to keep the cotton free from the same while it is maturing.

As will be evident the bars will adjust themselves to any unevenness of the ground as it is pulled across the field. In case a stone or other article is engaged all of the bars will be quickly pivoted upward and over the obstacle, or if the obstacle simply strikes against one, that one will raise up and pass over the obstacle while the others will remain in their original position.

In using the device it is preferable to place a weight of considerable size upon each of the drag bars so as to insure sufficient power for killing the weevils.

In operation it is preferable to drag a device formed according to the present invention across the field previous to the time when the weevil appears so as to form a comparatively smooth surface and also a trough for receiving and holding the weevils. The device is designed to be drawn across the field from then on, every few days or as often as may seem advisable in order to kill all of the weevils that may fall into the trough or ground between the rows of cotton. By this means the weevil, either in its full grown condition or while in the boll, is destroyed. After the weevil has become full grown or partially so it usually travels from one stalk of cotton to another and in doing so will fall into the trough or curved way between the rows and as the device is drawn across the field it will crush the weevils.

What I claim is:

In an exterminator, a plurality of drag bars, each of said drag bars having a runner formed with a curved end for passing over obstacles over which the exterminator is designed to pass, a cross bar, and means for pivotally securing each of said drag bars independently to said cross bar.

In testimony whereof I affix my signature in presence of two witnesses.

WILLIAM L. ROSSON.

Witnesses:
 J. C. MARNEY,
 I. D. SINGLETON.